United States Patent
Dissen

(10) Patent No.: US 12,236,940 B2
(45) Date of Patent: Feb. 25, 2025

(54) TECHNIQUES FOR IMPROVED AUDIO PROCESSING USING ACOUSTIC AND LANGUAGE IDENTIFICATION MODELS

(71) Applicant: GONG.io Ltd., Ramat Gan (IL)

(72) Inventor: Yehoshua Dissen, Modiin (IL)

(73) Assignee: GONG.io Ltd., Ramat Gan (IL)

( * ) Notice: Subject to any disclaimer, the term of this patent is extended or adjusted under 35 U.S.C. 154(b) by 324 days.

(21) Appl. No.: 17/933,618

(22) Filed: Sep. 20, 2022

(65) Prior Publication Data

US 2024/0119924 A1 Apr. 11, 2024

(51) Int. Cl.
*G10L 15/06* (2013.01)
*G10L 15/02* (2006.01)
*G10L 15/065* (2013.01)

(52) U.S. Cl.
CPC ............ *G10L 15/063* (2013.01); *G10L 15/02* (2013.01); *G10L 15/065* (2013.01)

(58) Field of Classification Search
CPC .................................................... G10L 15/063
See application file for complete search history.

(56) References Cited

U.S. PATENT DOCUMENTS

| | | | |
|---|---|---|---|
| 9,489,630 B2 | 11/2016 | Achin et al. | |
| 10,460,036 B2 | 10/2019 | Duong et al. | |
| 11,210,144 B2 | 12/2021 | Goodsitt et al. | |
| 2019/0272818 A1* | 9/2019 | Fernandez | G10L 13/10 |
| 2020/0311572 A1 | 10/2020 | Baker | |
| 2022/0230628 A1* | 7/2022 | Zhu | G10L 15/063 |

FOREIGN PATENT DOCUMENTS

| | | | | |
|---|---|---|---|---|
| CN | 111768765 A | * | 10/2020 | G10L 15/063 |
| KR | 100480790 B1 | * | 4/2005 | G10L 15/14 |

OTHER PUBLICATIONS

T. Winkler, D. Stein, R. Bardeli, D. Schneider and J. Koehler, "Potentials for ASR based on Multiple Acoustic Models and Model Selection using Standard Speech Features," Speech Communication; 10. ITG Symposium, Braunschweig, Germany, 2012, pp. 1-4. (Year: 2012).*
CN111768765A-Yin_Translation.pdf (Year: 2020).*
KR100480790B1-Choi_Translation (Year: 2005).*

(Continued)

*Primary Examiner* — Daniel C Washburn
*Assistant Examiner* — Moulay Youssef Bellimam
(74) *Attorney, Agent, or Firm* — M&B IP Analysts, LLC

(57) ABSTRACT

A system and method for audio processing. A method includes tuning hyperparameters of an acoustic model based on outputs of a language identification (LID) model for a training audio data set and outputs of the acoustic model for the training audio data set; applying the LID model to a first set of features extracted from a processing audio data set in order to produce outputs of the LID model for the processing audio data set; and applying the acoustic model to a second set of features extracted from the processing audio data set and the outputs of the LID model in order to produce outputs of the acoustic model for the processing audio data set.

19 Claims, 6 Drawing Sheets

(56) References Cited

OTHER PUBLICATIONS

R. Sahraeian and D. Van Compernolle, "Crosslingual and Multilingual Speech Recognition Based on the Speech Manifold," in IEEE /ACM Transactions on Audio, Speech, and Language Processing, vol. 25, No. 12, pp. 2301-2312, Dec. 2017, doi: 10.1109/TASLP.2017.2751747 (Year: 2017).*
Tong, Sibo. Multilingual training and adaptation in speech recognition. No. 7896. EPFL, 2020 (Year: 2020).*
A. Titus, J. Silovsky, N. Chen, R. Hsiao, M. Young and A. Ghoshal, "Improving Language Identification for Multilingual Speakers," ICASSP 2020—2020 IEEE International Conference on Acoustics, Speech and Signal Processing (ICASSP), Barcelona, Spain, 2020, pp. 8284-8288, doi: 10.1109/ICASSP40776.2020.90 (Year: 2020).*
"What Role Does an Acoustic Model Play in Speech Recognition?". Rev.com. 2022.
Denis B., Aleksandr M., and Vadim N. "Accomplishing Speaker Recognition Tasks with Machine Learning and Deep Learning—Practical Evaluation of Tools, Techniques, and Models". Apriorit. 2022.
Joos Korstanje. "GridSearch: the Ultimate Machine Learning Tool". Towards Data Science. 2020.
Li, Ke, Jinyu Li, Guoli Ye, Rui Zhao, and Yifan Gong. "Towards Code-Switching ASR for End-to-End CTC Models". ICASSP 2019-2019 IEEE International Conference on Acoustics, Speech and Signal Processing (ICASSP). 2019. pp. 6076-6080. IEEE. UK.

* cited by examiner

TECHNIQUES FOR IMPROVED AUDIO PROCESSING USING ACOUSTIC AND LANGUAGE IDENTIFICATION MODELS

TECHNICAL FIELD

The present disclosure relates generally to audio processing, and more particularly to audio processing of speech content in various languages.

BACKGROUND

Audio processing, and particularly processing of audio content including speech, is a critical component to any computer-implemented speech recognition program used for understanding and acting upon words said during conversations. Various solutions for processing speech content exist. In particular, several solutions utilize one or more models for purposes such as recognizing the language being spoken during a conversation, the sounds being made, and more. To this end, automated speech recognition systems often include components such as an acoustic model and a language model (e.g., a language identification model).

An acoustic model typically handles analysis of raw audio waveforms of human speech by generating predictions for the phoneme (unit of sounds) each waveform corresponds to. The waveforms analyzed by the acoustic model are extremely nuanced. Not only can they be based on actual sounds produced by a given speaker, but they can also be influenced by background noise from the environment in which the sounds are captured. The language model makes predictions related to the structure of language such as, for example, probabilities for certain sequences of words. In particular, a language identification model may be used to predict the language being spoken based on the structure of the grammar within the analyzed speech content.

A challenge in accurately processing speech content arises in the context of code switching. Code switching occurs when speakers switch between languages mid-conversation. In particular, code switching is a common occurrence during business conversations conducted primarily in non-English languages. More specifically, many common business terms are frequently ported over from English such that, even during a conversation in another language, the speaker may switch to English in order to say a particular business term.

As an example of code switching, a speaker talking with another person in Hebrew may say "רוצים לבדוק שפרסמנוads מתוך כל ה-revenueשאנחנו", which translates to "We want to check revenue from all the ads we published." Note that the terms "revenue" and "ads" are spoken in English during the otherwise Hebrew conversation. Thus, in this example sentence, the speaker switches back-and-forth between English and Hebrew. Processing the speech content including this sentence using only an English model or only a Hebrew model will lead to incorrect processing of the content, thereby inaccurately identifying words and/or ideas expressed in the speech.

Computerized solutions for language processing face challenges in accurately processing speech content containing words spoken in multiple languages interspersed with each other. In particular, existing solutions typically use an appropriate speech recognition model selected based on a type of language identified in the speech.

When words from different languages are interspersed within the same content such as demonstrated in the example above, automated identification of an appropriate language for the entire phrase that simply classifies all of the speech into one language or another will often fail to account for the possibility that multiple languages are spoken within a given portion of content. More complex speech recognition algorithms could be created to analyze words from multiple different languages at once (i.e., analyzing each spoken word with respect to each potential language from among multiple potential languages), but processing words with respect to multiple different languages in this manner would require significantly more processing power and would take longer to process in order to obtain comparable results.

Further, even using such a more advanced model, that model may still fail to accurately recognize speech in some circumstances such as when different words in different languages include the same acoustics or due to differences in waveforms which might be caused by differences between speakers; accents, speech patterns, or errors made in pronouncing words. The differences in waveforms and their effects on automated speech recognition therefore presents not just a challenge in modeling, but also in signal processing. The challenges in signal processing may be exacerbated when the speaker is switching back-and-forth between languages, where pitches and timbres of sounds produced by a speaker may change suddenly.

In a non-automated analysis of the above example speech, a human who is familiar with both languages may draw on their experience and knowledge in order to determine which words were being spoken at which times. However, this solution is not suitable for a fully automated process because it would require intervention by a human operator. Moreover, using human operators as interpreters introduces potential subjectivity and human error into the process, which can materially affect the resulting performance and produce inconsistent results. In particular, the human would need to rely on their experience and subjectively evaluate the speech they heard, which can vary both by the listener (i.e., based on the listener's experience with different sounds) and by the speaker (i.e., the speaker's accent, speaking patterns, etc.).

Additionally, a human operator would be relying on the sounds they heard in order to determine which words were spoken. Various factors such as familiarity with different accents, the hearing proficiency of the human operator, and the amount of experience they have hearing certain words, differ from person to person and therefore would result in different evaluations from different human operators in at least some circumstances. Further, the sounds produced differ from speaker to speaker, for example due to differences in accents, speaking patterns, and the like. Overall, the challenge is that human operators must subjectively evaluate what the speech content sounds like relative to their own personal past experiences, which leads to inconsistent and often inaccurate results.

Solutions which improve the processing of speech content, particularly of speech content containing words spoken in different languages, are therefore highly desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for audio processing. The method comprises: tuning hyperparameters of an acoustic model based on outputs of a language identification (LID) model for a training audio data set and outputs of the acoustic model for the training audio data set; applying the LID model to a first set of features extracted from a processing audio data set in order to produce outputs of the LID model for the processing audio data set; and applying the acoustic model to a second set of features extracted from the processing audio data set and the outputs of the LID model in order to produce outputs of the acoustic model for the processing audio data set.

Certain embodiments disclosed herein also include a non-transitory computer readable medium having stored thereon causing a processing circuitry to execute a process, the process comprising: tuning hyperparameters of an acoustic model based on outputs of a language identification (LID) model for a training audio data set and outputs of the acoustic model for the training audio data set; applying the LID model to a first set of features extracted from a processing audio data set in order to produce outputs of the LID model for the processing audio data set; and applying the acoustic model to a second set of features extracted from the processing audio data set and the outputs of the LID model in order to produce outputs of the acoustic model for the processing audio data set.

Certain embodiments disclosed herein also include a system for audio processing. The system comprises: a processing circuitry; and a memory, the memory containing instructions that, when executed by the processing circuitry, configure the system to: tune hyperparameters of an acoustic model based on outputs of a language identification (LID) model for a training audio data set and outputs of the acoustic model for the training audio data set; apply the LID model to a first set of features extracted from a processing audio data set in order to produce outputs of the LID model for the processing audio data set; and apply the acoustic model to a second set of features extracted from the processing audio data set and the outputs of the LID model in order to produce outputs of the acoustic model for the processing audio data set.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
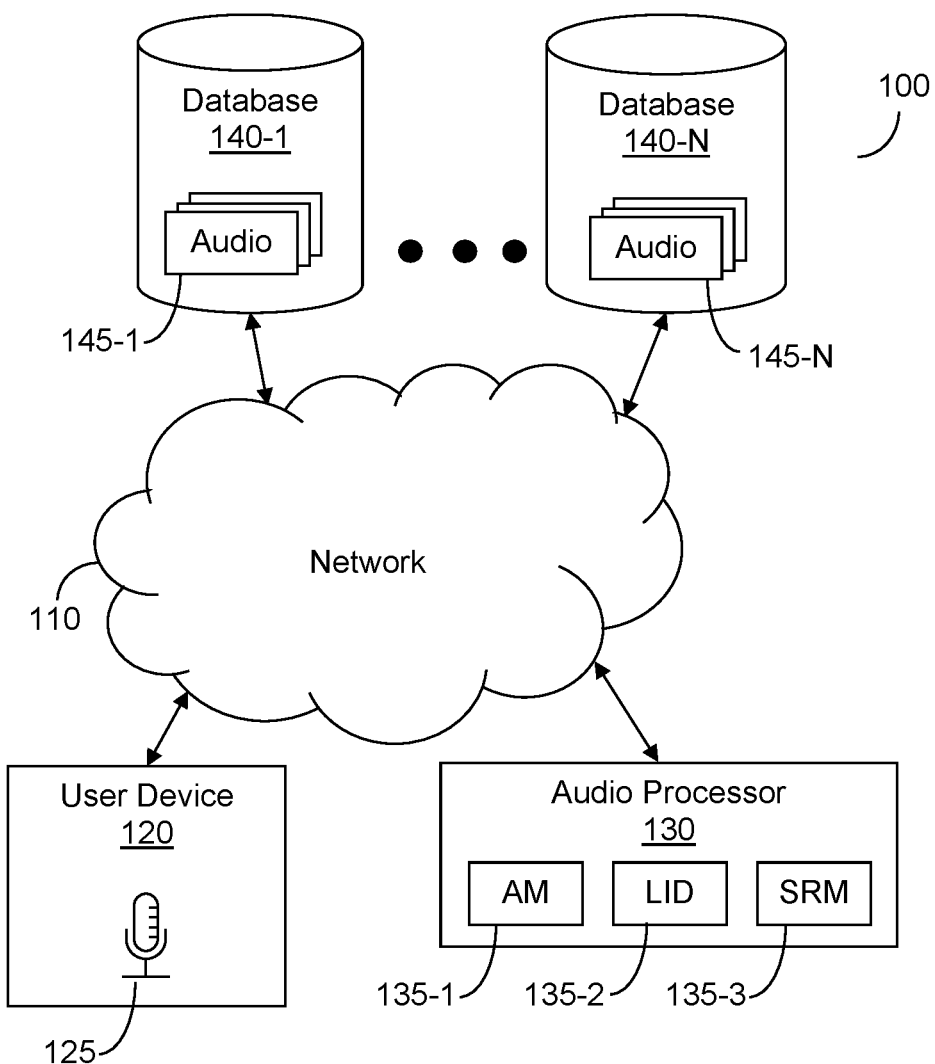
FIG. 1 is a network diagram utilized to describe various disclosed embodiments.

The various disclosed embodiments provide improved techniques for processing audio content and, in particular, audio content containing speech. More particularly, the disclosed embodiments provide robust processing that yields accurate predictions of words which are resilient to potential changes in language during a conversation, i.e., the challenge known as code switching.

To this end, the disclosed embodiments include techniques for improved speech processing including processes for training and for applying acoustic and language identification (LID) models in coordination. The disclosed techniques further include methods for using the results of the improved acoustic and LID models in order to improve accuracy of automated speech recognition techniques using outputs of such acoustic and LID models.

In an embodiment, a training process includes coordinating training of an acoustic model with a LID model in order to produce an acoustic model that is trained to account for losses related to inaccurate predictions of language by the LID model. The LID model is configured to output a probability for a language spoken in a given portion of content including speech (e.g., a frame of audio content). A training set of audio data including sounds related to words from multiple different languages (e.g., English and Hebrew, or English and German) is prepared. The acoustic model is trained using features extracted from the training set.

The results of applying the LID model to features extracted from the training set and the results of applying the acoustic model to features extracted from the training set are combined (e.g., by determining a product based on values representing the respective results of the models) in order to create a combined language-acoustic output. Based on the combined language-acoustic output, hyperparameters of the acoustic model are tuned in order to create a set of optimized hyperparameters for the acoustic model. The hyperparameters are configuration parameters for the acoustic model, and are tuned at least such that the acoustic model is configured to account for input from the LID model. In some versions, tuning the hyperparameters includes performing a grid search based on the combined language-acoustic output. The resulting acoustic model demonstrates a reduced error rate.

In an embodiment, an application process includes applying the trained acoustic model to audio content including speech in order to generate predictions which can be utilized for automated speech recognition. To this end, such audio content may be received and split into portions (e.g., into frames). The LID model is applied to features extracted from the portions of the audio content in order to output a probability for a language being spoken with respect to each portion of the audio content. The acoustic model is applied to features extracted from the portions of the audio content in order to output a probability for a particular sound being made in each portion of the audio content (e.g., a sound corresponding to a particular term).

The disclosed embodiments provide acoustic models which exhibit improved resiliency against variations in language within a portion of audio content. Moreover, the disclosed embodiments provide an objective, rules-based process involving specific steps related to particular models both during training and when applied to speech content which produces consistent results (i.e., applying the disclosed techniques to the comparable speech samples will yield comparable results). In particular, the disclosed embodiments include an improved process for tuning hyperparameters of the acoustic model using a LID model which provide objective, consistent.

Moreover, the disclosed embodiments provide techniques for speech recognition using acoustic and LID models which process audio content with respect to multiple languages more efficiently than solutions which analyze acoustics using a larger dataset of sets of sounds which collectively represent words spoken in multiple languages. The result is that applying the disclosed embodiments allows for providing speech recognition outputs while reducing processing power and time, thereby conserving computing resources needed for speech recognition. In this regard, it is noted that any model cannot account for all possible factors related to the purpose for which it is used, and the result is that modeling complex occurrences such as sounds and speech will at least sometimes result in inaccurate outputs, i.e., errors. By tuning the acoustic model to account for errors by the LID, the result of applying both models can be improved to provide more accurate predictions of sounds and, consequently, speech recognition based on those predictions.

FIG. 1 shows an example network diagram 100 utilized to describe the various disclosed embodiments. In the example network diagram 100, a user device 120, an audio processor 130, and a plurality of databases 140-1 through 140-N (hereinafter referred to individually as a database 140 and collectively as databases 140, merely for simplicity purposes) communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device (UD) 120 may be, but is not limited to, a personal computer, a laptop, a tablet computer, a smartphone, a wearable computing device, or any other device capable of receiving speech recognition outputs and utilizing those outputs for one or more user-facing functions. As non-limiting examples, the user device 120 may be configured to use speech recognition outputs for speech-to-text functions (e.g., for closed captioning or speech-to-text logging), for voice-activated commands (e.g., commands to a virtual agent or a self-driving vehicle), for voice-based authentication, combinations thereof, and the like.

The user device 120 may be further equipped with one or more input/output (I/O) devices and, in particular, audio-based I/O devices such as one or more microphones 125. The microphones 125 may be used to capture audio content containing speech (i.e., speech spoken by a user of the user device 120 or by others within capturing range of the microphones) in order to provide the audio processor 130 with audio content to be processed in accordance with the disclosed embodiments.

In an embodiment, the audio processor 130 is configured to process audio content (for example, audio content captured by the microphone 125 of the user device 120) in accordance with one or more of the disclosed techniques. To this end, the audio processor 130 may store any or all of an acoustic model (AM) 135-1, a language identification (LID) model 135-2, and speech recognition model (SRM) 135-3. In some embodiments, the audio processor 130 is configured to train at least the acoustic model 135-1, and may be further configured to train the LID 135-2, the speech recognition model 135-3, or both. In particular, in accordance with various disclosed embodiments, the audio processor 130 may be configured to train the acoustic model 135-1 in coordination with the LID 135-2 using outputs of the LID 135-2 as inputs to the training algorithm used to train the acoustic model 135-1 in order to produce an acoustic model that accounts for losses due to errors by the LID 135-2. The result is an improved acoustic model.

The training of the acoustic model 135-1 is performed using training audio content such as, but not limited to, audio content 145-1 through 145-N stored in respective databases 140-1 through 140-N. Such audio content 145 stored in the databases 140 includes audio content containing speech and, in particular, speech spoken in multiple different languages.

It should be noted that the user device 120 and the audio processor 130 are depicted as separate entities for the sake of discussion, but that at least a portion of the functions performed by the audio processor 130 may be performed by the user device 120 and vice versa without departing from the scope of the disclosure.

For example, the user device may be configured to apply the acoustic model 135-1, the LID 135-2, the speech recognition model 135-3, or a combination thereof, in order to process the speech captured via the I/O devices 125 rather than sending such audio content for processing from the user device 120 to the audio processor 130, and the audio processor 130 may be configured to train the acoustic model 135-1 in combination with the LID 135-2 as described herein. Likewise, the user device 120 may be configured to capture and send audio content to the audio processor 130, and the audio processor 130 may be further configured to perform one or more of the functions that utilize the outputs of the speech recognition model 135-3, and the results of such functions may be sent to the user device 120 for subsequent use or processing. As yet another example, the audio processor 130 may be configured to apply the acoustic model 135-1 and the LID 135-2 in coordination, and the user device 120 may have stored thereon the speech recognition model 135-3 for use in speech recognition based on outputs of the models 135-1 and 135-2 provided by the audio processor 130.

Figure 2:
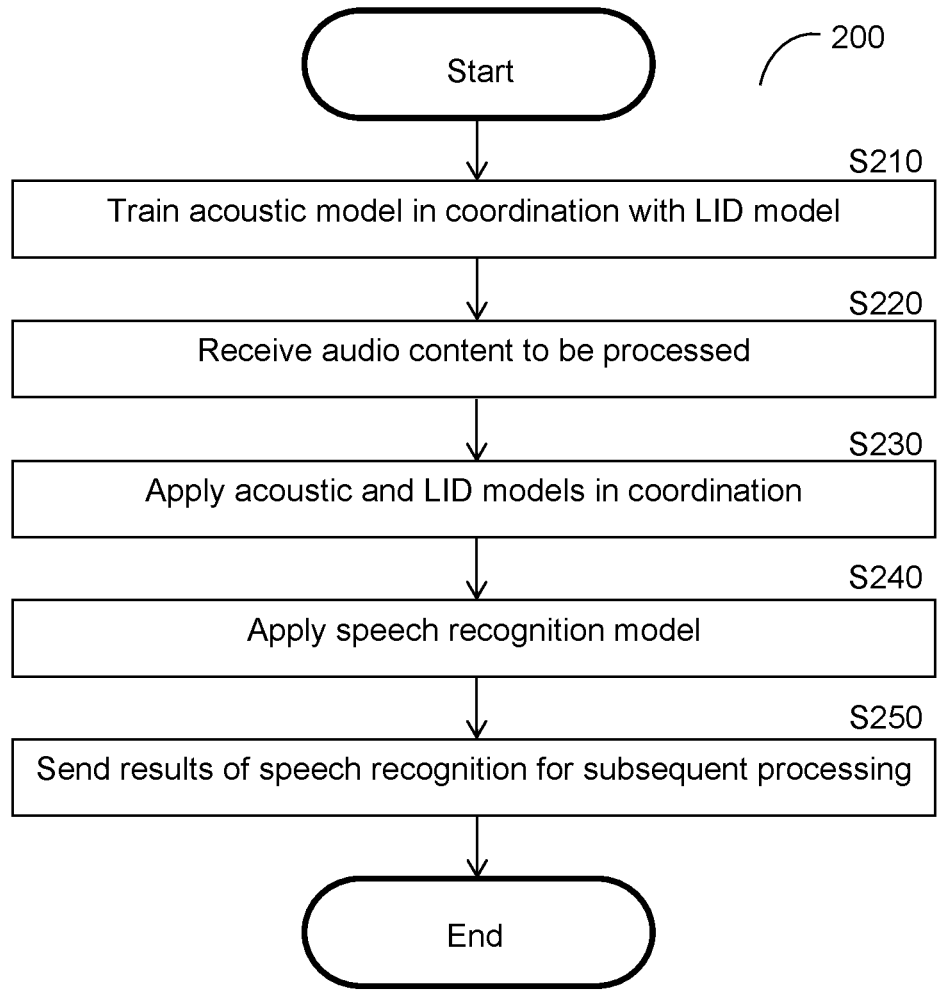
FIG. 2 is a flowchart illustrating a method for speech recognition using improved acoustic and language identification models according to an embodiment.

FIG. 2 is a flowchart 200 illustrating a method for speech recognition using improved acoustic and language identification models according to an embodiment. In an embodiment, the method is performed by the audio processor 130, FIG. 1.

At S210, an acoustic model is trained in coordination with a language identification (LID) model. In an embodiment, outputs of the acoustic model and outputs of the LID model are combined, and the combined outputs are utilized to tune hyperparameters of the acoustic model such that the acoustic model becomes trained to account for potential losses due to misidentification of languages by the LID model. The LID model may be a previously created model such as an LID model that was explicitly defined or an LID model that was previously trained using machine learning. In an embodiment, the acoustic model is trained as discussed further below with respect to FIGS. 3 and 4.

At S220, audio content to be processed is received. The received audio content at least includes speech content and, in particular, speech content which might include words spoken in multiple different languages. By processing the audio content using an acoustic model which has been tuned to account for potential losses due to errors by a LID model as discussed herein, the audio content is processed more accurately and effectively, particularly when the audio content contains audio demonstrating words spoken in multiple languages that are intertwined within the audio content.

At S230, the trained acoustic model and the LID model used for training of the acoustic model are applied in coordination. Specifically, the LID model is applied to features extracted from the audio content, and the acoustic model is applied to features extracted from the audio content as well as the outputs of the LID model. As noted above, the acoustic model is tuned such that it accounts for potential errors by the LID model. In an embodiment, the models are applied as discussed further below with respect to FIG. 5.

At S240, a speech recognition model is applied based on the outputs of the acoustic and LID models. The speech recognition model is designed to identify spoken words in multiple languages based on acoustics identified within the audio content. In an embodiment, S240 may include applying one or more automated speech recognition (ASR) techniques such as, but not limited to, Hidden Markov models (HMMs), dynamic time warping (DTW), deep learning ASR algorithms, combinations thereof, and the like.

At S250, the results of applying the speech recognition model are output as recognized speech and sent for subsequent processing. The subsequent processing may include, but is not limited to, modifying the speech recognition outputs (e.g., reformatting, cleaning, or otherwise adjusting the outputs for later use), providing the speech recognition outputs to a model or program which utilizes speech outputs (e.g., for speech-to-text processing or other uses), both, and the like. To this end, the outputs of the speech recognition process are provided as inputs to one or more processes for subsequent processing. In some implementations, the outputs of the speech recognition may be sent to one or more systems (e.g., the user device 120, FIG. 1) configured for such subsequent processing.

In some embodiments, S250 further includes utilizing the outputs for one or more subsequent processing steps such as, but not limited to, creating text (e.g., for a speech-to-text program), providing words identified among the recognized speech as inputs to a decision model (e.g., a model for determining which actions to take based on user inputs in the form of spoken words), and the like. To this end, in such embodiments, S250 may include applying models or programs configured to perform such subsequent processing to the outputs of the speech recognition or to features extracted from those outputs in order to perform the subsequent processing.

Figure 3:
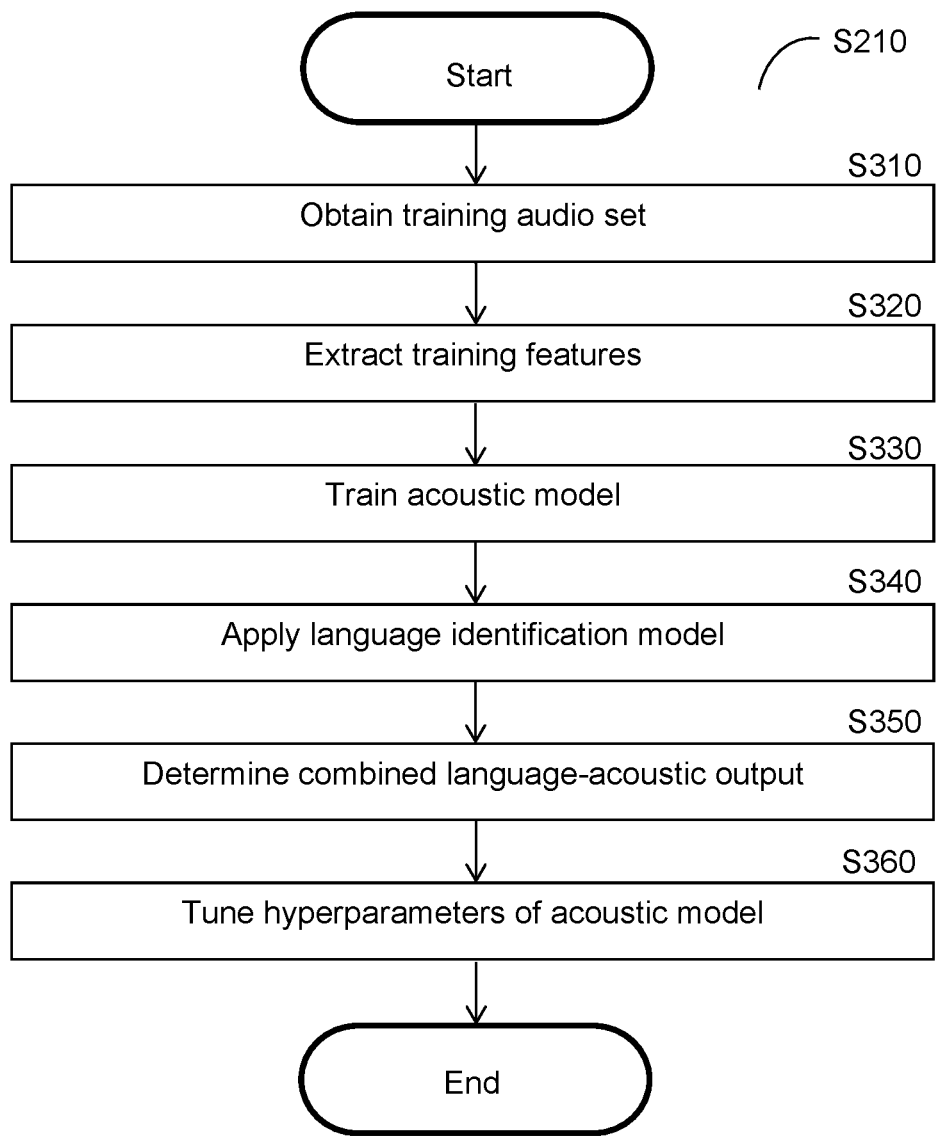
FIG. 3 is a flowchart illustrating a method for training an acoustic model to account for losses due to inaccurate language predictions by a language identification model according to an embodiment.

FIG. 3 is a flowchart S210 illustrating a method for training an acoustic model to account for losses due to inaccurate language predictions by a language identification model according to an embodiment. In an embodiment, the method is performed by the audio processor 130, FIG. 1.

At S310, a training audio set is obtained. In an embodiment, the training audio set is a set of training data including audio and, in particular, including portions of audio such as frames containing words spoken in multiple languages. For example, the training audio set includes frames of audio, with at least some frames including sounds produced by speakers saying words in multiple languages among those frames. In a further embodiment, the training audio set may include portions having words spoken in pairs of languages (i.e., sets of exactly two languages). As a non-limiting example, frames in the training audio set may include frames containing both English words and Hebrew words, or may include frames containing both English words and Spanish words.

At S320, training features to be used for training and tuning the acoustic model are extracted. In an embodiment, S320, includes performing signal processing in order to transform raw audio waveforms into vectors which can be utilized by the acoustic model and the linguistic model. Extracting the features may further include removing ambient noise or otherwise normalizing the waveforms. Non-limiting example featurization methods for extracting the features may be or may include calculating mel-frequency cepstral coefficients (MFCCs), performing perceptual linear prediction, or both.

A set of features may be extracted for both the acoustic model and the LID, or different sets of features may be extracted for the acoustic model and for the LID. In some embodiments, S320 may further include splitting the training audio data into different portions (e.g., into frames). The features may then be extracted from the split portions. In a further embodiment, at least some of the split portions to be used for training the acoustic model include portions containing words spoken in multiple languages. As a non-limiting example, the split portions include frames containing words in both English and in Spanish.

At S330, the acoustic model is trained using one or more machine learning techniques based on at least some of the extracted features. As noted above, the training features are extracted from at least some portions of content containing words spoken in multiple languages. The result is a machine learning acoustic model which is trained to recognize acoustics in multiple languages. Specifically, parameters such as weights of the acoustic model may be learned via the training such that the acoustic model is configured to output probabilities representing potential acoustics in portions of audio content (e.g., frames). In an embodiment, S330 further includes applying the trained acoustic model to produce outputs including predictions of acoustics for different portions of the training audio content (e.g., for different frames in the training audio content).

At S340, the language identification (LID) model is applied in order to output predictions of languages based on at least some of the extracted features. The LID model may be trained or otherwise designed to output probabilities of languages spoken for each portion of content represented by the extracted features (e.g., probabilities indicating that each of multiple languages is the language being spoken in a given frame).

In some embodiments, S340 may further include training the LID model using at least some of the extracted features of the training audio set. Alternatively, the LID model may be previously created, e.g., previously trained or created without machine learning.

At S350, a combined language-acoustic output is determined based on the outputs of the acoustic model and the LID model. In an embodiment, S350 includes determining a product based on probability values representing respective predictions output by the acoustic model and the LID model. The resulting combined language-acoustic output is a product of probabilities vector including a set of products of probabilities.

At S360, hyperparameters of the acoustic model are tuned based on the combined language-acoustic output in order to create a tuned acoustic model that accounts for possible losses caused by errors in outputs from the LID model. The hyperparameters are values of model configurations that are external to the acoustic model itself and whose value cannot be estimated from the training data itself. In other words, the hyperparameters are configuration values that are not learned by training the acoustic model alone. In accordance with various disclosed embodiments, at least some of the hyperparameters are determined via tuning based on the combined language-acoustic output that also accounts for outputs from the LID model.

The types of hyperparameters to be tuned may depend on the type of machine learning model used as the acoustic model. Non-limiting example hyperparameters include learning rate for training a neural network, C and sigma hyperparameters for support vector machines, and the value of k for a model using a k-nearest neighbor algorithm.

In an embodiment, S360 includes performing one or more machine learning model hyperparameter tuning techniques such as, but not limited to, a grid search or random search. Such a tuning technique includes computing the optimal values for hyperparameters. Because the tuning is performed based on a combined output of the LID and acoustic models, the resulting tuned acoustic model accounts for effects of the LID model on predictions in order to improve the accuracy of the acoustic model when it is applied in coordination with the LID model. The grid search may include selecting combinations of hyperparameters, while the random search may include choosing the combinations of hyperparameters randomly.

Figure 4:
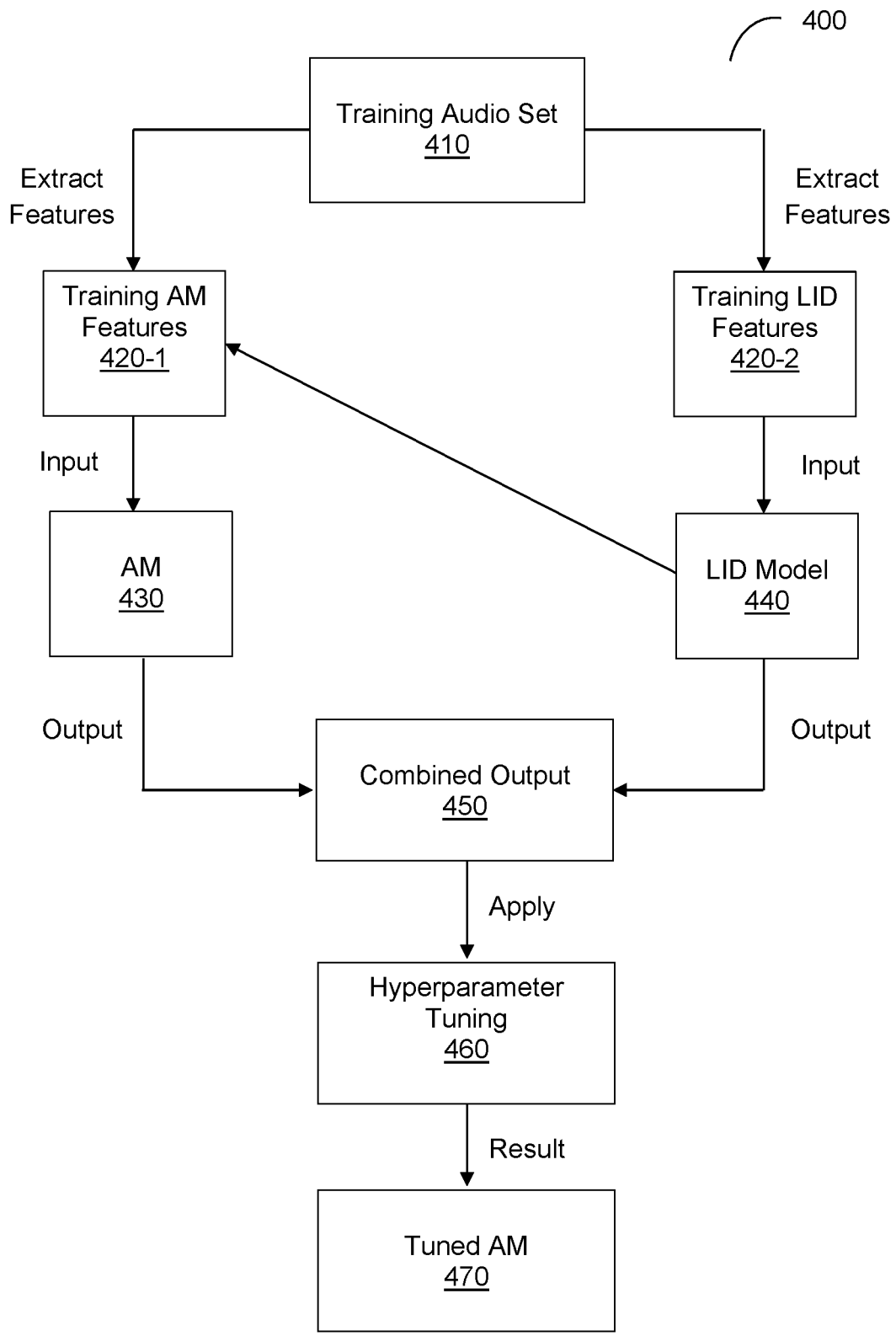
FIG. 4 is a flow diagram illustrating a process for training an acoustic model in coordination with a language identification model.

FIG. 4 is an example flow diagram 400 illustrating the process of training the acoustic model in coordination with the language identification model (for example, the process described above with respect to FIG. 3).

Features are extracted from training audio set 410 to produce a set of training acoustic model (AM) features 420-1 and a set of training language identification (LID) model features 420-2. The training AM features 420-1 are input to the acoustic model 430 in order to produce a first set of outputs, and the training LID model features 420-2 are input to the LID model 440 in order to produce a second set of outputs.

The outputs of the acoustic model 430 and the LID model 440 are combined in order to produce a combined language-acoustic output 450. The combined output 450 is provided to a hyperparameter tuning algorithm 460 in order to tune the hyperparameters for the acoustic model 430, thereby producing a tuned acoustic model 470.

Figure 5:
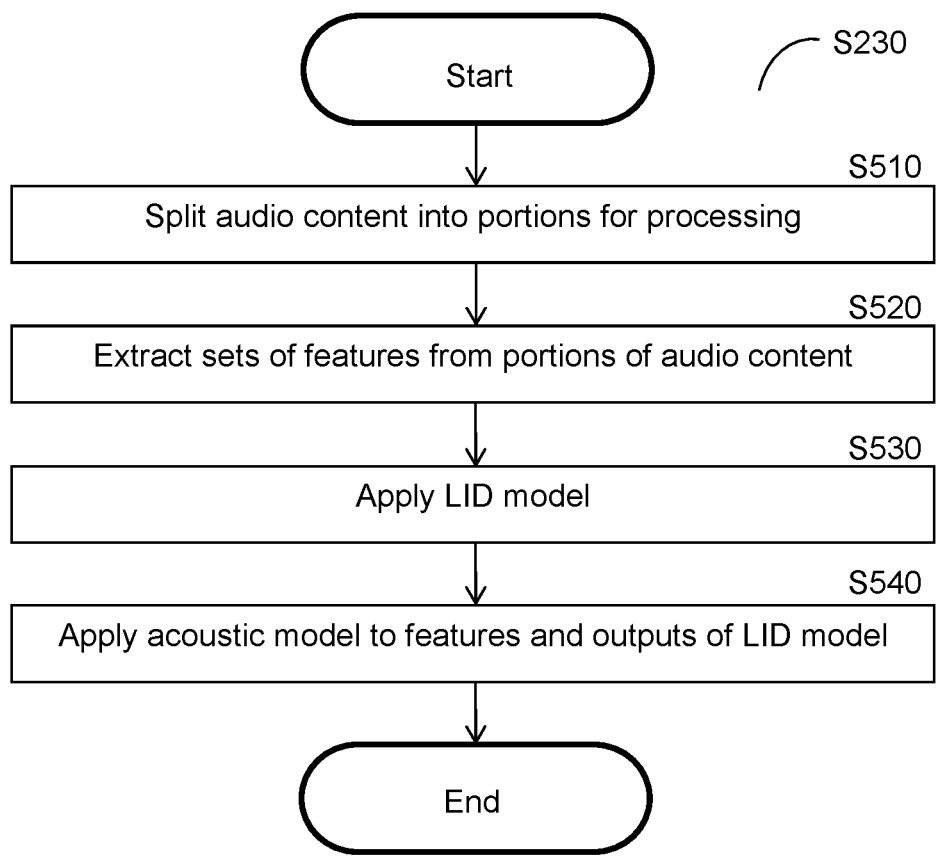
FIG. 5 is a flowchart illustrating a method for applying acoustic and language identification models according to an embodiment.

FIG. 5 is a flowchart S230 illustrating a method for applying acoustic and language identification models according to an embodiment. In an embodiment, the method is performed by the audio processor 130, FIG. 1.

At S510, audio content to be processed is split into portions for further processing. In an example implementation, the portions are frames of audio content.

At S520, features are extracted from the audio content. In an embodiment, the features are extracted from the split portions (e.g., from the frames).

Extracting the features may include, but is not limited to, performing signal processing in order to transform raw audio waveforms into vectors which can be utilized by the appropriate models. Extracting the features may further include removing ambient noise or otherwise normalizing the waveforms. Non-limiting example featurization methods for extracting the features may be or may include calculating mel-frequency cepstral coefficients (MFCCs), performing perceptual linear prediction, or both A set of features may be extracted for application by both the acoustic model and the LID, or different sets of features may be extracted for the acoustic model and for the LID.

At S530, a LID model is applied to features among the extracted features. In an embodiment, the LID model applied at S530 is a LID model used for tuning of an acoustic model to be applied to the features.

At S540, the acoustic model is applied to features among the extracted features and to outputs of the LID model applied at S530.

Applying the acoustic model based on outputs of the LID allows for determining the probabilities output by the acoustic model based on the likely languages being spoken as determined by the LID in addition to the acoustics themselves. This allows for improving the accuracy of the acoustic model as compared to only basing decisions on the acoustics and without accounting for probable languages. For example, the acoustics corresponding to the English letter "B" and the Hebrew letter "beth" will have similar probabilities determined by an acoustic model, and knowing the language being spoken allows the acoustic model to more accurately determine which acoustic is actually being produced.

However, this approach faces challenges in accurately processing signals, since errors by the LID model can affect the acoustic model's decisions. For example, in the prior example, if the LID model outputs a high probability that the language being spoken is Hebrew, the acoustic model would output a high probability for the acoustic corresponding to the letter "beth." If the language actually being spoken is in English such that the actual acoustic is the one corresponding to the letter "B," the output by the acoustic model will be inaccurate.

As noted above, the acoustic model is tuned to account for potential errors by the LID model. Consequently, applying the acoustic model tuned in this manner to outputs of the LID model improves the signal processing performed by the acoustic model and, in particular improves the accuracy of results of the acoustic model. This provides a particularly notable improvement when the audio content includes code switching, although it also improves accuracy more generally even when code switching does not occur in a given audio content.

Figure 6:
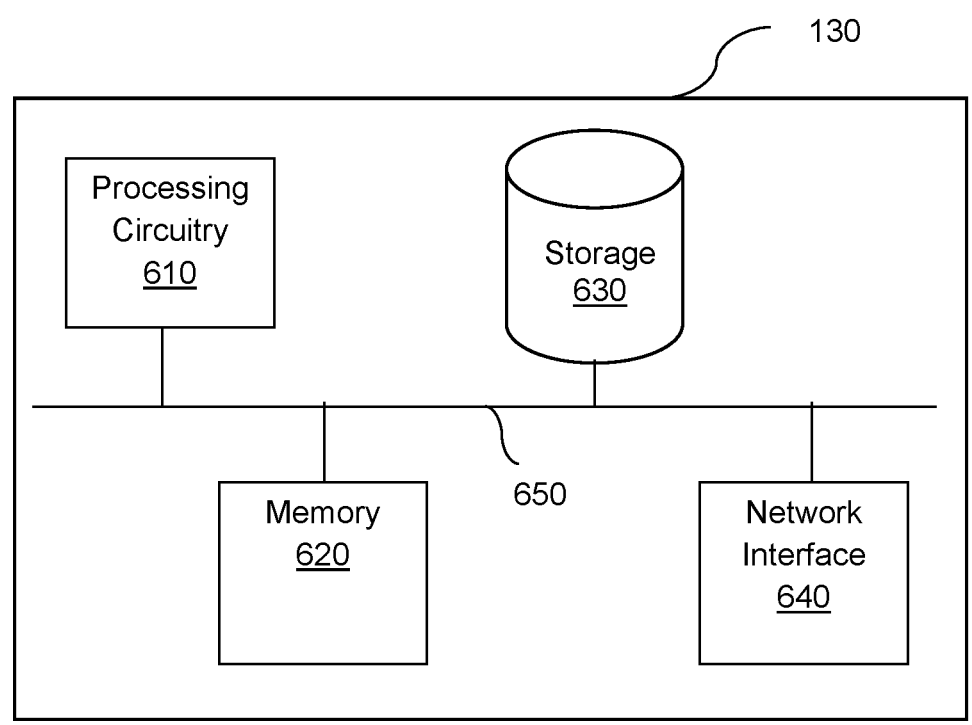
FIG. 6 is a schematic diagram of an audio processor according to an embodiment.

FIG. 6 is an example schematic diagram of an audio processor 130 according to an embodiment. The audio processor 130 includes a processing circuitry 610 coupled to a memory 620, a storage 630, and a network interface 640. In an embodiment, the components of the audio processor 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the audio processor 130 to communicate with, for example, the user device 120, the databases 140, both, and the like.

It should be understood that the embodiments described herein are not limited to the specific architecture illustrated in FIG. 6, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for audio processing, comprising:
    tuning hyperparameters of an acoustic model based on outputs of a language identification (LID) model for a training audio data set and outputs of the acoustic model for the training audio data set;
    applying the LID model to a first set of features extracted from a processing audio data set in order to produce outputs of the LID model for the processing audio data set; and
    applying the acoustic model to a second set of features extracted from the processing audio data set and the outputs of the LID model in order to produce outputs of the acoustic model for the processing audio data set.

2. The method of claim 1, further comprising:
    applying at least one speech recognition model to the outputs of the acoustic model for the processing audio data set.

3. The method of claim 1, further comprising:
    determining a combined language-acoustic output based on the outputs of the LID model for the training audio data set and outputs of the acoustic model for the training audio data set, wherein the hyperparameters of the acoustic model are tuned based on the combined language-acoustic output.

4. The method of claim 3, wherein the outputs of each of the acoustic model and the LID model for the training audio data set include a set of probability values, wherein determining the combined language-acoustic output further comprises:
    determining a products of probabilities vector based on the set of probability values of the acoustic model for the training audio data set and the set of probability values of the LID model for the training audio data set, wherein the combined language-acoustic output is determined based on the product.

5. The method of claim 3, wherein tuning the hyperparameters of the acoustic model further comprises:
    performing a grid search on the combined language-acoustic output in order to determine optimal values for at least one of the hyperparameters.

6. The method of claim 1, further comprising:
    training the acoustic model using features extracted from the training audio data set, wherein the hyperparameters are tuned based further on outputs of the trained acoustic model.

7. The method of claim 6, wherein the training audio data set includes speech content containing words spoken in a plurality of languages.

8. The method of claim 7, wherein the speech content contains words spoken in exactly two languages.

9. The method of claim 1, wherein the hyperparameters of the acoustic model are tuned in order to account for errors by the LID model.

10. A non-transitory computer readable medium having stored thereon instructions for causing a processing circuitry to execute a process, the process comprising:
tuning hyperparameters of an acoustic model based on outputs of a language identification (LID) model for a training audio data set and outputs of the acoustic model for the training audio data set;
applying the LID model to a first set of features extracted from a processing audio data set in order to produce outputs of the LID model for the processing audio data set; and
applying the acoustic model to a second set of features extracted from the processing audio data set and the outputs of the LID model in order to produce outputs of the acoustic model for the processing audio data set.

11. A system for audio processing, comprising:
a processing circuitry; and
a memory, the memory containing instructions that, when executed by the processing circuitry, configure the system to:
tune hyperparameters of an acoustic model based on outputs of a language identification (LID) model for a training audio data set and outputs of the acoustic model for the training audio data set;
apply the LID model to a first set of features extracted from a processing audio data set in order to produce outputs of the LID model for the processing audio data set; and
apply the acoustic model to a second set of features extracted from the processing audio data set and the outputs of the LID model in order to produce outputs of the acoustic model for the processing audio data set.

12. The system of claim 11, wherein the system is further configured to:
apply at least one speech recognition model to the outputs of the acoustic model for the processing audio data set.

13. The system of claim 11, wherein the system is further configured to:
determine a combined language-acoustic output based on the outputs of the LID model for the training audio data set and outputs of the acoustic model for the training audio data set, wherein the hyperparameters of the acoustic model are tuned based on the combined language-acoustic output.

14. The system of claim 13, wherein the outputs of each of the acoustic model and the LID model for the training audio data set include a set of probability values, wherein the system is further configured to:
determine a products of probabilities vector based on the set of probability values of the acoustic model for the training audio data set and the set of probability values of the LID model for the training audio data set, wherein the combined language-acoustic output is determined based on the product.

15. The system of claim 13, wherein the system is further configured to:
perform a grid search on the combined language-acoustic output in order to determine optimal values for at least one of the hyperparameters.

16. The system of claim 11, wherein the system is further configured to:
train the acoustic model using features extracted from the training audio data set, wherein the hyperparameters are tuned based further on outputs of the trained acoustic model.

17. The system of claim 16, wherein the training audio data set includes speech content containing words spoken in a plurality of languages.

18. The system of claim 17, wherein the speech content contains words spoken in exactly two languages.

19. The system of claim 11, wherein the hyperparameters of the acoustic model are tuned in order to account for errors by the LID model.

* * * * *